Dec. 3, 1940.  J. K. HODNETTE  2,223,726
PROTECTIVE DEVICE FOR ELECTRICAL APPARATUS AND SYSTEMS
Filed Oct. 2, 1937  2 Sheets-Sheet 1
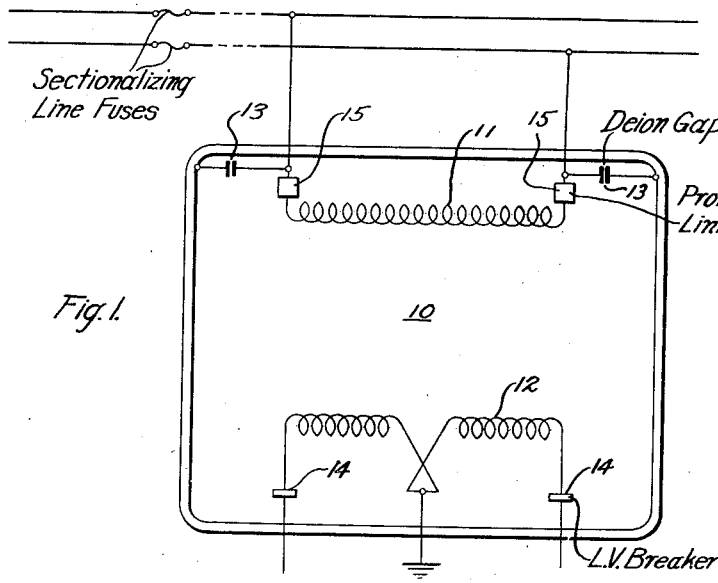
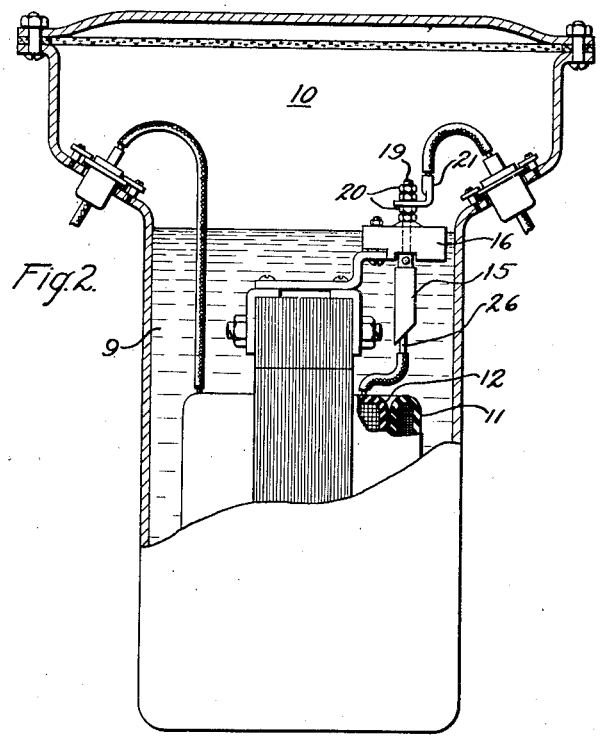
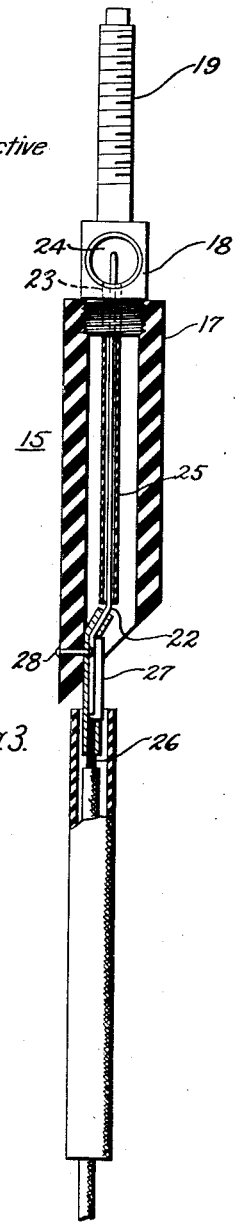
WITNESSES:
C. F. Oberheim
Wm. C. Groome
INVENTOR
John K. Hodnette
BY Ezra W. Savage
ATTORNEY Patented Dec. 3, 1940

2,223,726

UNITED STATES PATENT OFFICE 2,223,726

PROTECTIVE DEVICE FOR ELECTRICAL APPARATUS AND SYSTEMS

John K. Hodnette, Sharon, Pa., assignor to Westinghouse Electric & Manufacturing Company, East Pittsburgh, Pa., a corporation of Pennsylvania Application October 2, 1937, Serial No. 167,040

10 Claims. (Cl. 200—113)

The invention relates generally to protective devices for electrical apparatus and systems and more particularly to protective links for protecting electrical apparatus against abnormal voltage and current conditions in the system in which it may be connected.

The object of the invention is to provide a protective link for electrical apparatus and systems which will fuse on the development of predetermined conditions and disconnect the apparatus from the circuit in which it may be connected or interrupt the system.

The invention, accordingly, is disclosed in the embodiment thereof shown in the accompanying drawings and comprises the features of construction, combination of elements, and arrangement of parts, which will be exemplified in the construction hereinafter set forth, and the scope of the application of which will be indicated in the claims.

For a fuller understanding of the nature and objects of the invention, reference should be had to the following detailed description, taken in connection with the accompanying drawings, in which:

Figure 1 is a diagrammatic view of the windings of a transformer showing the location of the protective link when it is connected in circuit relation with the transformer.

Fig. 2 is a view partly in section and partly in side elevation showing a protective link in position in a transformer.

Fig. 3 is a view partly in section and partly in side elevation of a protective link constructed in accordance with this invention.

Figure 4:
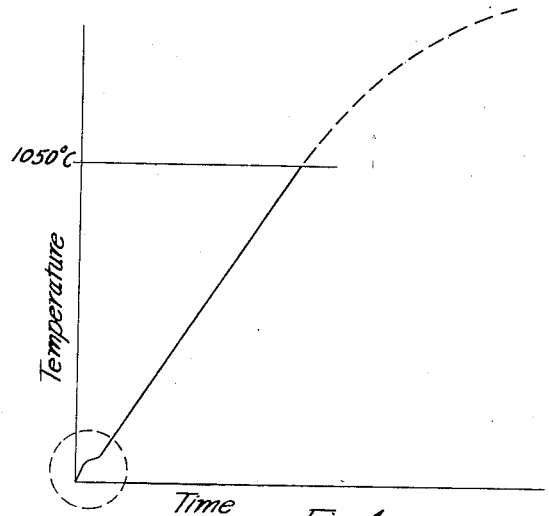
Fig. 4 is a graph showing how the fusible conductor performs at temperatures ranging from atmospheric to the fusing temperature.

Referring now to the drawings and Fig. 1 in particular, a transformer 10 is illustrated as being provided with a primary winding 11 and a secondary winding 12 arranged in accordance with the standard practice. Deion gaps 13 are connected between the terminals of the primary winding 11 and ground to protect the transformer from surges of all kinds which have their origin in the line circuit, while low voltage breakers 14 are connected in circuit relation with the secondary windings 12 to protect the windings from disturbances or overloads which may develop in the low voltage circuits.

In order to protect the electrical apparatus such as transformers from faults in the windings or faults on the terminal board, a protective link 15 is connected in series circuit relation with the primary winding 11. As illustrated in Fig. 1, the protective links are preferably connected between the winding and the deion gaps 13. Protective links may also be connected in the secondary circuits depending on the operating conditions to be met. However, it will suffice to describe the functioning of the protective links in the primary circuits to disclose the features of the invention.

The protective links 15 may be mounted in any suitable manner. The method of mounting them will, to some extent, depend on the structure of the apparatus with which they are to be utilized. In Fig. 2, a protective link 15 is shown mounted in a transformer 10. As illustrated, the protective link is suspended from a terminal board 16 mounted in the transformer in any well known manner and is immersed in the dielectric 9. The method of suspending the protective link from the terminal board 16 will be described hereinafter.

The preferred embodiment of the protective link illustrated in Fig. 3 comprises a tubular case 17 made from some suitable material such as fibre which has high mechanical strength and is not subject to appreciable deterioration when exposed to dielectrics. The upper end of the case 17 is provided with an internal thread for receiving the threaded end of a plug 18 made of some suitable material such as copper. Carried by the plug 18 is a threaded conductor 19 of sufficient length to extend through the terminal board 16 and receive the lock nuts 20 and the terminal conductor 21. In this manner the protective link illustrated may be suspended from the terminal board.

A fusible conductor 22 is disposed in the tubular case 17. This conductor 22 may be made from any suitable material having the desired characteristics such as fusing temperature and capacity to resist corrosion by dielectrics and sufficient mechanical strength. It has been found that a wire sold to the trade under the name "Everdur" has the required characteristics. Other materials which have been found to be satisfactory are copper, aluminum and metals and alloys which are not affected by oil. In the preferred modification to be described hereinafter an "Everdur" fusible conductor 22 is provided.

In mounting the fusible conductor, it may be connected to the plug 18 in any suitable manner. In the modification illustrated in Fig. 2, the fusible conductor 22 is inserted through a vertical opening 23 into the transverse opening 24 where it is soldered to the plug 18. The openings 23 and 24, provided in the plug 18 for receiving the conductor 22, permit a circulation of the dielectric 9.

A tube 25 is mounted on the conductor 22. As illustrated the tube 25 has an internal diameter slightly larger than the external diameter of the conductor 22. The tube may be made from any suitable material such as fibre which experiments have shown is well suited for the purpose. The size of the tube may be predetermined when the operating conditions to be met by the protective link are known.

The lower end of the fusible conductor 22 may be connected to the secondary terminal 26 of the transformer coil in any suitable manner as by providing a lug or sleeve 27. The conductors 22 and 26 are soldered to the sleeve. The sleeve is then pinned to the tube as shown at 28. While the specific method of connecting the conductors 22 and 26 has been described, it will be readily appreciated that other methods may be employed.

Figure 5:
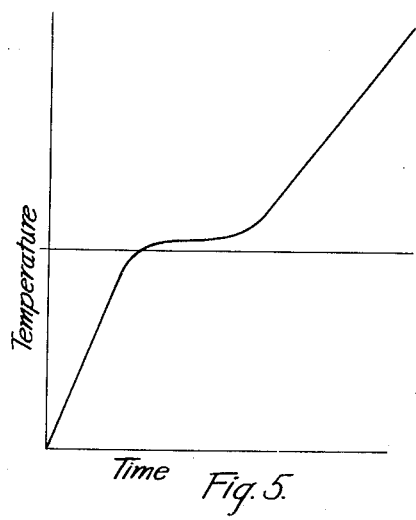
Fig. 5 is the lower portion of the graph illustrated in Fig. 4 to show more clearly how the fusible link performs.

When a graph for "Everdur" wire is plotted with temperature as the ordinate and time as the abscissa, curves similar to those shown in Figs. 4 and 5 are obtained. The horizontal portion of the curve best shown in Fig. 5 occurs near the boiling or cracking temperature of the dielectric. The horizontal portion of the graph representing a time during which a rise in temperature is delayed results from the specific heat absorbed in converting the dielectric from a liquid into a gas or vapor.

In selecting the proper size of fusible conductor for a particular piece of apparatus and for example the transformer in the modification illustrated, it must be properly coordinated with the breakers and fuses. In order to do this, curves may be plotted for different sizes of conductors. Further, the specific rating of the transformer for which the protective link is to be provided will also be available. Having this information, breakers and fuses may be provided which will protect the transformer against loads in excess of the capacity of the electrical apparatus. Further, the characteristics of the line in which the apparatus is to be introduced will be known.

Figure 6:
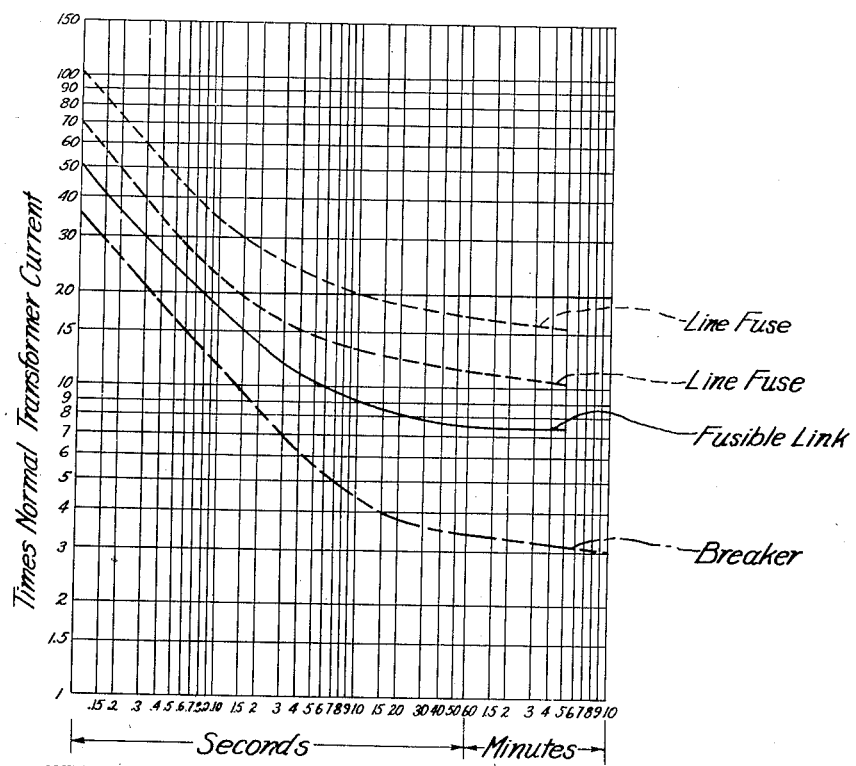
Fig. 6 is a set of curves showing the current time characteristics of breakers and fuses provided for electrical apparatus and the corresponding curve for the protective link showing how it is coordinated with the other units of the electrical system.

The curves for the breaker and fuses are plotted as illustrated in Fig. 6, allowance being made for the ratio between the primary currents and the secondary currents as shown. A fusible link 22 is then selected by reference to the curves prepared for different sizes of "Everdur" wire which will properly fit between the graphs for the fuses and the breaker as illustrated. In this manner the protective link is so coordinated that its fusing time characteristic lies between the predetermined operating load trip time for the low voltage breaker and the predetermined operating circuit interrupting time for the power company's protective devices on the high voltage side.

In selecting the fusible conductor, attention should be given to the providing of a margin of selectivity that will suit the operating conditions. This is a matter that anyone skilled in the art can readily take care of and no attempt will be made to give further detailed information.

If a tube 25 were not provided in conjunction with the protective link, the performance would be somewhat erratic because when the dielectric begins to boil as a result of excessive current the turbulence set up in the tube 17 would cause the cooling effect of the dielectric to vary greatly. When a tube 25 is provided, the erratic variation in temperature of the fusible link is eliminated. In other words, the provision of the tube 25 stabilizes the action of the fusible link. Further, by proportioning the size of the tube 25 to the diameter of the wire the shape of the time-temperature curve such as shown in Fig. 5 can be controlled.

The size of the tube 25 relative to the fusible link 22 may be arrived at by experiment. For example, good results have been obtained by utilizing a tube of .04 inch inside diameter with a fusible conductor .010 inch in diameter. This conductor is generally identified as No. 30 B. & S. gauge. It will be readily appreciated that an innumerable number of sizes of tubes and fusible conductors may be worked out to be used in the making of fusible links.

When a tube such as 25 is utilized, and the fusible link 22 is subjected to an excessive current, the temperature will rise until the dielectric reaches the boiling or cracking point, when it will start a circulation of the dielectric through the tube and will establish a constant cooling rate for that condition. The dielectric may circulate from the bottom upwardly through the tube and through the openings 23 and 24.

The stabilization of the rate of temperature rise for a predetermined current facilitates the making of the protective link, since the size of fusible conductor and tube that are required to meet known conditions can be predetermined.

When the fusible link 22 reaches its fusing temperature which is in the neighborhood of 1050° C., it will be fused into parts and an arc established. The gases generated act on the lug or sleeve 27 and force it downwardly out of the case 17, effecting a wide separation of the fused parts and thereby cooperating to effect a quenching of the arc. The turbulence that is established in the dielectric adjacent the lower end of the protective link by the vapors or gases have a desired arc quenching effect. The wide separation of the fused parts of the fusible conductor 22 prevents the restriking of the arc.

The fusible link selected should have a fusing temperature that is higher than the boiling or cracking temperature of the dielectric. As it happens, the oils normally employed as dielectrics in transformers have a cracking temperature considerably below 1050° C. which is the fusing temperature for "Everdur."

When the protective link is subjected to abnormal conditions which may result in the boiling or cracking of a portion of the dielectric but not the fusing of the link 22, the temperature will return to normal and normal operating conditions are restored. The gas accumulated in the tubular case 17 may escape through the openings 23 and 24.

Since certain changes may be made in the above article and different embodiments of the invention could be made without departing from the scope thereof, it is intended that all matter contained in the above description or shown in the accompanying drawings shall be interpreted as illustrative and not in a limiting sense.

I claim as my invention:

1. A protective device for electrical apparatus comprising, in combination, a conductor having predetermined fusing characteristics, a liquid dielectric in which the conductor may be immersed, means for housing the conductor and means associated with the conductor to utilize the gases resulting from the decomposition of the liquid dielectric to control the heat transfer from the conductor by the dielectric, thereby to predetermine the conditions under which the conductor will fuse when connected in circuit relation with the electrical apparatus.

2. A protective device for electrical apparatus comprising, in combination, a conductor which will fuse under predetermined conditions, a liquid dielectric in which the conductor is immersed and a tube into which the dielectric may enter, the conductor being disposed in the tube, the liquid dielectric and tube being cooperative to predetermine the conditions under which the conductor will fuse.

3. A protective device for electrical apparatus comprising, in combination, a conductor which will fuse at predetermined temperatures, a dielectric in which the conductor is immersed, the fusing temperature of the conductor being higher than the boiling temperature of the dielectric, and a tube disposed on the conductor and open to the dielectric, the tube and dielectric being cooperative to predetermine the conditions under which the conductor will fuse.

4. A protective link for electrical apparatus comprising, in combination, a tubular case, a conductor extending through the case, said conductor having a portion which will fuse when subjected to predetermined conditions, a lug carried by one end of the case, a dielectric in which the protective link is immersed, the lug being disposed to facilitate the entry of the dielectric into the tubular case and a tube disposed on the fusible portion of the conductor, the tube being open at both ends to permit the entry of the dielectric.

5. In a protective device for electrical apparatus, in combination, a conductor which will fuse when subjected to predetermined operating conditions, a dielectric in which a portion of the fusible conductor is immersed, and a tube disposed on a portion of the fusible conductor immersed in the dielectric, the tube being open at both ends to permit the entry of the dielectric to cooperate in the heat transfer from the portion of the conductor immersed in the dielectric thereby to stabilize and accelerate the heating of the fusible conductor.

6. A protective device for electrical apparatus comprising, in combination, a conductor having predetermined fusing characteristics, a dielectric cooperative with the conductor to function as a heat transfer medium, means for housing the conductor and a tube disposed on the conductor to control the heat transfer effected by the dielectric thereby to predetermine the conditions under which the conductor will fuse when connected in circuit relation with the electrical apparatus.

7. In a protective device for electrical systems, in combination, a fusible conductor, means for electrically connecting the fusible conductor in circuit relation in the electrical system, a liquid dielectric capable of being decomposed by an electric arc in which the fusible conductor is disposed, a tubular member, the inside diameter of the tubular member having a predetermined relation to the diameter of the fusible conductor disposed therein, the tubular member cooperating to stabilize the heat transfer effected by the liquid dielectric.

8. A protective device for electrical systems comprising, in combination, a conductor which will fuse under predetermined conditions, a case in which the fusible conductor is disposed, means for electrically connecting the fusible conductor in circuit relation in the electrical system, a liquid dielectric in which the fusible conductor is disposed, a tubular member, the inside diameter of which has a predetermined relation to the diameter of the fusible conductor disposed on said fusible conductor, the tubular member cooperating to control the flow of the liquid dielectric along the fusible conductor to stabilize the heat transfer from the fusible conductor, and means responsive to the generation of gases by the rise in temperature or the fusing of the fusible conductor to effect a separation of the fused portions to cooperate in the quenching of the arc and prevent the restriking of the arc.

9. In a protective device for electrical systems, in combination, a fusible conductor, a case in which the fusible conductor is disposed, a tubular member mounted on the fusible conductor, a liquid dielectric in which the fusible member is disposed, the tubular member being cooperative to control the flow of the liquid dielectric along the fusible conductor to stabilize the heat transfer from the conductor through the liquid dielectric making it possible to predetermine its performance, and a terminal member carried by the case and disposed to be acted upon by gases generated through the heating of or fusing of the fusible conductor, the terminal member serving to effect the separation of the fused portions of the fusible member and a turbulence in the body of liquid dielectric to cooperate in the quenching of an arc and the prevention of the restriking of an arc.

10. In a protective device for electrical systems provided with line fuses and low-voltage breakers, in combination, a fusible conductor, a case for the fusible conductor, a tubular member mounted on the fusible conductor, and a dielectric in which the fusible conductor is disposed, the tubular member having an inside diameter having a predetermined relation to the diameter of the fusible conductor to stabilize and give a predetermined heat transfer in conjunction with the dielectric, the fusible conductor being selected with a predetermined time-current curve.

JOHN K. HODNETTE.